(12) United States Patent
Oskotsky et al.

(10) Patent No.: US 7,271,965 B1
(45) Date of Patent: Sep. 18, 2007

(54) WIDEBAND APOCHROMATIC LENS SYSTEM

(75) Inventors: Mark Oskotsky, Mamaroneck, NY (US); Michael J. Russo, Jr., Roslyn, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 11/649,624

(22) Filed: Jan. 4, 2007

(51) Int. Cl.
*G02B 9/312* (2006.01)
(52) U.S. Cl. .................................. 359/785; 359/784
(58) Field of Classification Search ........... 359/785, 359/784, 690, 689, 687, 686, 774, 773
See application file for complete search history.

(56) References Cited

U.S. PATENT DOCUMENTS

| 5,333,076 A | 7/1994 | Wight |
| 5,959,785 A | 9/1999 | Adachi |
| 5,973,859 A | 10/1999 | Abe |
| 6,147,815 A | 11/2000 | Fujie |

OTHER PUBLICATIONS

Schott, Technical Information Publication TIE-29, Refractive Index and Dispersion (Jan. 2007), at pp. 1 to 4.
Optics 1, Inc. & Schott AG, Removing the Mystique of Glass Selection, at <www.optics1.com/pdfs/removing_mystique.pdf>.

*Primary Examiner*—Timothy Thompson
(74) *Attorney, Agent, or Firm*—Leo Zucker

(57) ABSTRACT

A wideband, e.g., 550 nm to 940 nm, apochromatic lens system for use with an external aperture stop, includes first, second, and third optical groups having, in order, positive, negative, and positive powers. The first group includes four optical elements having, in order, negative, positive, negative, and positive powers. The second group includes one element of negative power; and the third group includes two elements each having positive power. In another embodiment for use with an internal stop, the system includes first, second, and third optical groups having, in order, positive, positive, and negative powers. The first group includes four optical elements having, in order, positive, negative, positive, and negative powers. The second group includes one element of positive power, and the third group includes one element of negative power. In either embodiment, all of the optical elements are formed from not more than three different types of glass material.

29 Claims, 18 Drawing Sheets

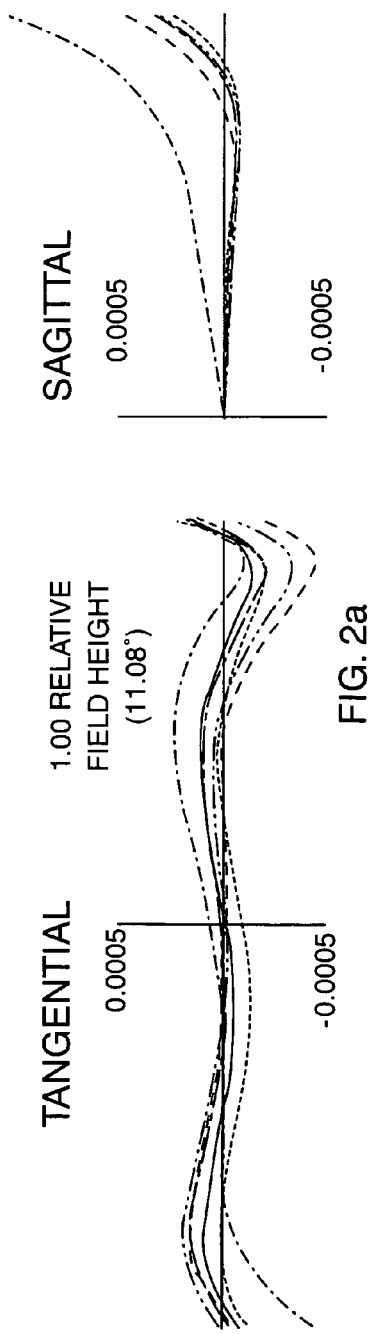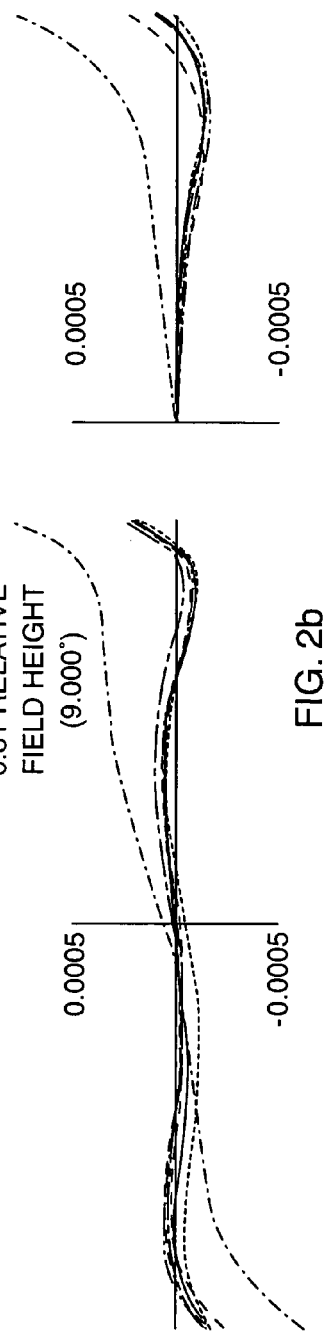
FIG. 2a
FIG. 2b

Embodiment 1

|  | Radius | Thickness | Glass |
|---|---|---|---|
| >OBJ: | INFINITY | INFINITY | |
| STO: | INFINITY | 1.270000 | |
| 2: | 4.91313 | 0.200000 | KZFSN5_SCHOTT |
| 3: | 2.58112 | 0.005000 | AIR |
| 4: | 2.60013 | 0.700000 | SBSM71_OHARA |
| 5: | -7.83069 | 0.114396 | AIR |
| 6: | -6.64771 | 0.150000 | KZFSN5_SCHOTT |
| 7: | 3.70281 | 0.005000 | AIR |
| 8: | 3.25012 | 0.400000 | SLAM51_OHARA |
| 9: | 22.25784 | 4.353096 | AIR |
| 10: | -2.23276 | 0.150000 | KZFSN5_SCHOTT |
| 11: | 10.41156 | 1.310552 | AIR |
| 12: | 39.88873 | 0.800000 | SBSM71_OHARA |
| 13: | -5.54787 | 0.005000 | AIR |
| 14: | 7.26549 | 0.850000 | SLAM51_OHARA |
| 15: | -35.99327 | 1.365741 | AIR |
| 16: | INFINITY | 0.157500 | LLF2_SCHOTT |
| 17: | INFINITY | 0.692305 | AIR |
| 18: | INFINITY | 0.040000 | SAPHIR_SPECIAL |
| 19: | INFINITY | 0.790125 | AIR |
| IMG: | INFINITY | 0.000000 | |

SPECIFICATION DATA

| FNO | 5.60000 | | | | | |
|---|---|---|---|---|---|---|
| DIM | IN | | | | | |
| WL | 940.00 | 861.00 | 782.00 | 704.00 | 625.00 | 546.00 |
| REF | 4 | | | | | |
| WTW | | 20 | 42 | 73 | 98 | 82 | 20 |
| INI | ORA | | | | | |
| XAN | 0.00000 | 0.00000 | 0.00000 | 0.00000 | | |
| YAN | 0.00000 | 6.00000 | 9.00000 | 11.08000 | | |
| WTF | 1.50000 | 1.00000 | 1.00000 | 1.00000 | | |
| VUY | 0.00000 | 0.00000 | 0.00000 | 0.00000 | | |
| VLY | 0.00000 | 0.00000 | 0.00000 | 0.00000 | | |
| POL | N | | | | | |

FIG. 4

| REFRACTIVE INDICES | | | | | | |
|---|---|---|---|---|---|---|
| GLASS CODE | 940.00 | 861.00 | 782.00 | 704.00 | 625.00 | 546.00 |
| LLF2_SCHOTT | 1.529671 | 1.531203 | 1.533079 | 1.535454 | 1.538715 | 1.543449 |
| SAPHIR_SPECIAL | 1.756932 | 1.758668 | 1.760689 | 1.763129 | 1.766331 | 1.770783 |
| SBSM71_OHARA | 1.636535 | 1.638213 | 1.640257 | 1.642832 | 1.646347 | 1.651415 |
| KZFSN5_SCHOTT | 1.638267 | 1.640475 | 1.643167 | 1.646570 | 1.651241 | 1.658042 |
| SLAM51_OHARA | 1.685980 | 1.687910 | 1.690284 | 1.693299 | 1.697448 | 1.703468 |

INFINITE CONJUGATES
EFL     11.9500
BFL      0.7936
FFL     -2.0192
FNO      5.6000
IMG DIS  0.7901
OAL     12.5686
PARAXIAL IMAGE
HT       2.3402
ANG     11.0800
ENTRANCE PUPIL
DIA      2.1339
THI      0.0000
EXIT PUPIL
DIA     12.6289
THI    -69.9283

FIG. 5

EFL 11.95 INCHES
F# 5.6
FOV ±11°

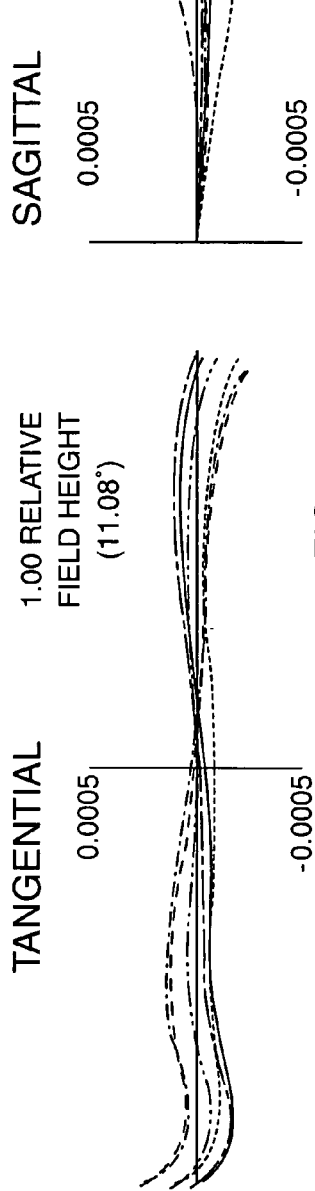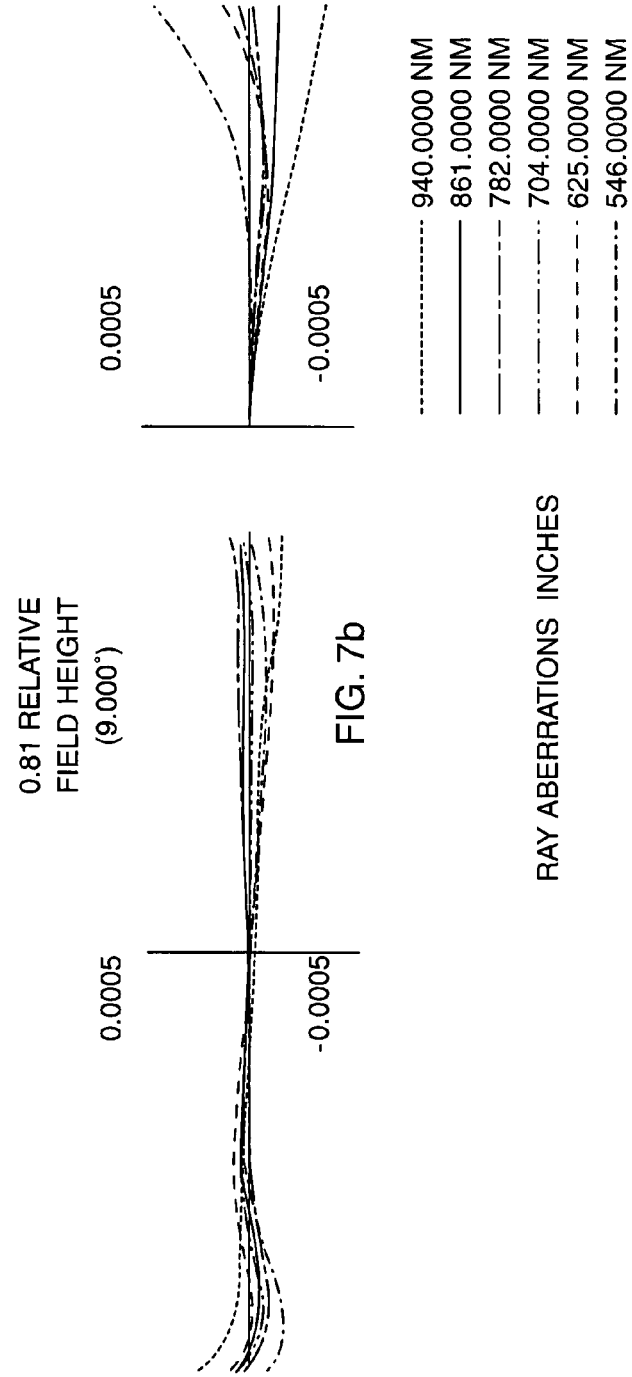

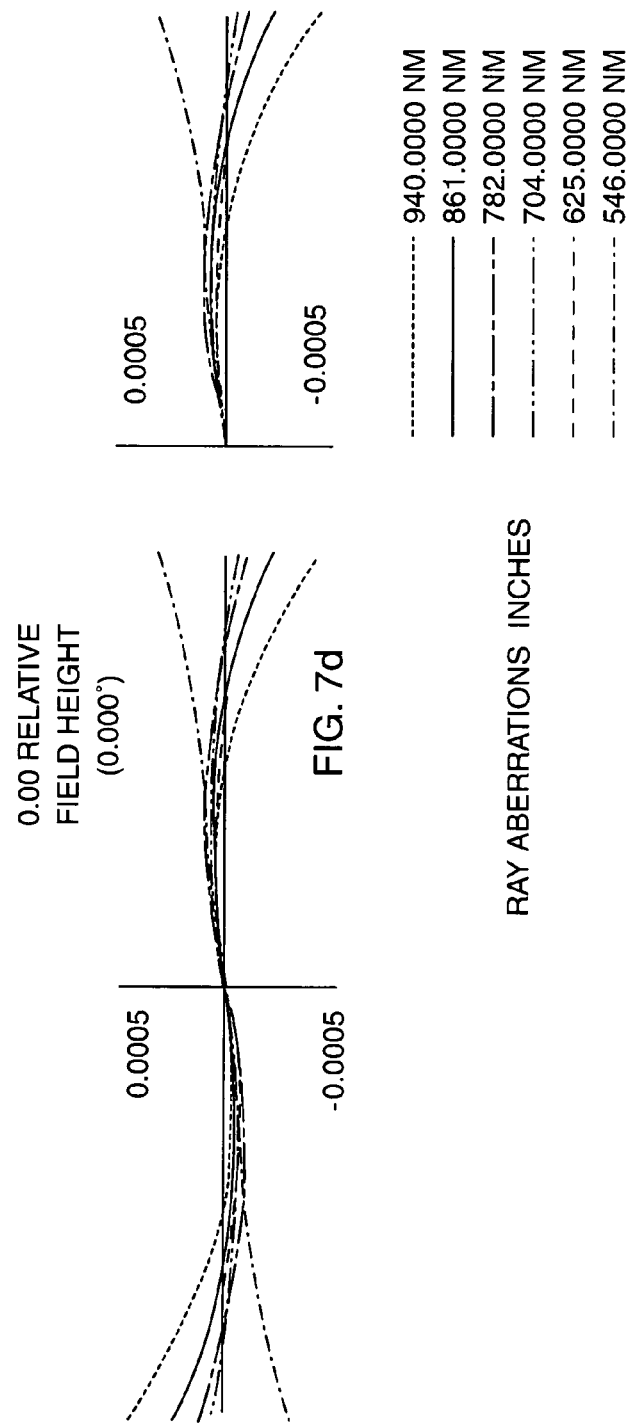

Embodiment 2

|      | Radius    | Thickness | Glass          |
|------|-----------|-----------|----------------|
| OBJ: | INFINITY  | INFINITY  |                |
| 1:   | 4.39061   | 0.500000  | SLAL54_OHARA   |
| 2:   | -12.67322 | 0.425565  | AIR            |
| 3:   | -5.81211  | 0.150000  | KZFSN5_SCHOTT  |
| 4:   | 3.48874   | 0.125988  | AIR            |
| STO  | INFINITY  | 0.393238  | AIR            |
| 6:   | 4.72847   | 0.500000  | NLAF2_SCHOTT   |
| 7:   | -4.08294  | 0.032157  | AIR            |
| 8:   | -4.37984  | 0.150000  | KZFSN5_SCHOTT  |
| 9:   | 6.38603   | 2.227151  | AIR            |
| 10:  | 20.74020  | 0.400000  | SLAL54_OHARA   |
| 11:  | -8.79559  | 4.823095  | AIR            |
| 12:  | -3.95367  | 0.300000  | KZFSN5_SCHOTT  |
| 13:  | -6.85878  | 1.621404  | AIR            |
| 14:  | INFINITY  | 0.157500  | LLF2_SCHOTT    |
| 15:  | INFINITY  | 0.811718  | AIR            |
| 16:  | INFINITY  | 0.040000  | SAPHIR_SPECIAL |
| 17:  | INFINITY  | 0.790125  | AIR            |
| IMG: | INFINITY  | 0.000000  |                |

SPECIFICATION DATA

| | | | | | | |
|---|---|---|---|---|---|---|
| FNO | 5.60000 | | | | | |
| DIM | IN | | | | | |
| WL  | 940.00 | 861.00 | 782.00 | 704.00 | 625.00 | 546.00 |
| REF | 4 | | | | | |
| WTW | 20 | 42 | 73 | 98 | 82 | 20 |
| INI | ORA | | | | | |
| XAN | 0.00000 | 0.00000 | 0.00000 | 0.00000 | | |
| YAN | 0.00000 | 6.00000 | 9.00000 | 11.08000 | | |
| WTF | 1.00000 | 1.00000 | 1.00000 | 1.00000 | | |
| VUY | 0.00000 | 0.00000 | 0.00000 | 0.00000 | | |
| VLY | 0.00000 | 0.00000 | 0.00000 | 0.00000 | | |
| POL | N | | | | | |

FIG. 9

REFRACTIVE INDICES

| GLASS CODE | 940.00 | 861.00 | 782.00 | 704.00 | 625.00 | 546.00 |
|---|---|---|---|---|---|---|
| NLAF2_SCHOTT | 1.728244 | 1.730373 | 1.733014 | 1.736396 | 1.741079 | 1.747923 |
| KZFSN5_SCHOTT | 1.638267 | 1.640475 | 1.643167 | 1.646570 | 1.651241 | 1.658042 |
| LLF2_SCHOTT | 1.529671 | 1.531203 | 1.533079 | 1.535454 | 1.538715 | 1.543449 |
| SAPHIR_SPECIAL | 1.756932 | 1.758668 | 1.760689 | 1.763129 | 1.766331 | 1.770783 |
| SLAL54_OHARA | 1.639484 | 1.641123 | 1.643105 | 1.645585 | 1.648948 | 1.653764 |

INFINITE CONJUGATES
EFL     11.9500
BFL      0.7935
FFL    -13.7958
FNO      5.6000
IMG DIS  0.7901
OAL     12.6578
PARAXIAL IMAGE
HT       2.3402
ANG     11.0800
ENTRANCE PUPIL
DIA      2.1339
THI      1.1176
EXIT PUPIL
DIA      1.7099
THI     -8.7820

FIG. 10

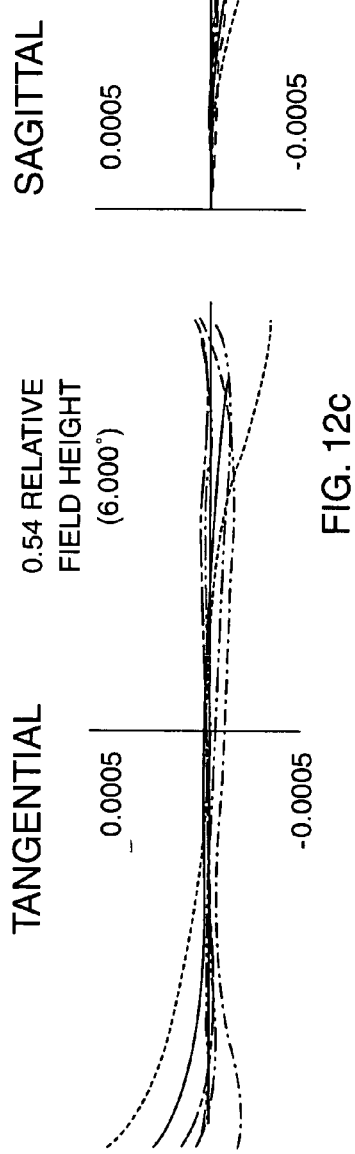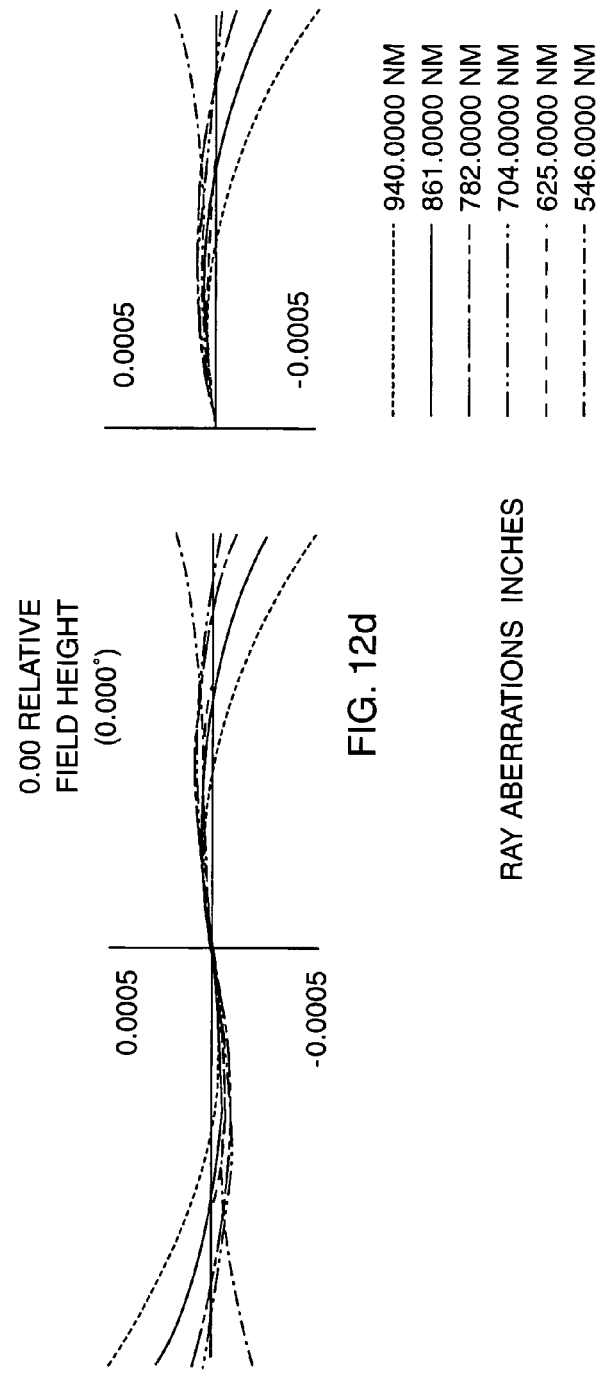

Embodiment 3

|  | Radius | Thickness | Glass |
|---|---|---|---|
| >OBJ: | INFINITY | INFINITY |  |
| 1: | 4.36121 | 0.500000 | SLAL54_OHARA |
| 2: | -12.90573 | 0.424947 | AIR |
| 3: | -5.84824 | 0.150000 | EADF50_HOYA |
| 4: | 3.49936 | 0.125568 | AIR |
| STO: | INFINITY | 0.413867 | AIR |
| 6: | 4.78201 | 0.500000 | NLAF2_SCHOTT |
| 7: | -4.11365 | 0.039074 | AIR |
| 8: | -4.40776 | 0.150000 | EADF50_HOYA |
| 9: | 6.38470 | 2.216956 | AIR |
| 10: | 20.11256 | 0.400000 | SLAL54_OHARA |
| 11: | -8.82153 | 4.765396 | AIR |
| 12: | -3.96447 | 0.300000 | EADF50_HOYA |
| 13: | -6.89272 | 1.646646 | AIR |
| 14: | INFINITY | 0.157500 | LLF2_SCHOTT |
| 15: | INFINITY | 0.836960 | AIR |
| 16: | INFINITY | 0.040000 | SAPHIR_SPECIAL |
| 17: | INFINITY | 0.790125 | AIR |
| IMG: | INFINITY | 0.000000 |  |

SPECIFICATION DATA

| | | | | | | |
|---|---|---|---|---|---|---|
| FNO | 5.60000 | | | | | |
| DIM | IN | | | | | |
| WL | 940.00 | 861.00 | 782.00 | 704.00 | 625.00 | 546.00 |
| REF | 4 | | | | | |
| WTW | 20 | 42 | 73 | 98 | 82 | 20 |
| INI | ORA | | | | | |
| XAN | 0.00000 | 0.00000 | 0.00000 | 0.00000 | | |
| YAN | 0.00000 | 6.00000 | 9.00000 | 11.08000 | | |
| WTF | 1.00000 | 1.00000 | 1.00000 | 1.00000 | | |
| VUY | 0.00000 | 0.00000 | 0.00000 | 0.00000 | | |
| VLY | 0.00000 | 0.00000 | 0.00000 | 0.00000 | | |
| POL | N | | | | | |

FIG. 14

| REFRACTIVE INDICES | | | | | | |
|---|---|---|---|---|---|---|
| GLASS CODE | 940.00 | 861.00 | 782.00 | 704.00 | 625.00 | 546.00 |
| NLAF2_SCHOTT | 1.728244 | 1.730373 | 1.733014 | 1.736396 | 1.741079 | 1.747923 |
| LLF2_SCHOTT | 1.529671 | 1.531203 | 1.533079 | 1.535454 | 1.538715 | 1.543449 |
| SAPHIR_SPECIAL | 1.756932 | 1.758668 | 1.760689 | 1.763129 | 1.766331 | 1.770783 |
| SLAL54_OHARA | 1.639484 | 1.641123 | 1.643105 | 1.645585 | 1.648948 | 1.653764 |
| EADF50_HOYA | 1.638248 | 1.640461 | 1.643162 | 1.646572 | 1.651246 | 1.658043 |

INFINITE CONJUGATES
EFL    11.9500
BFL    0.7937
FFL    -13.7274
FNO    5.6000
IMG DIS  0.7901
OAL    12.6669
PARAXIAL IMAGE
HT    2.3402
ANG    11.0800
ENTRANCE PUPIL
DIA    2.1339
THI    1.1169
EXIT PUPIL
DIA    1.7179
THI    -8.8263

FIG. 15

WIDEBAND APOCHROMATIC LENS SYSTEM

BACKGROUND OF THE INVENTION

1. Field of the Invention

This invention relates to optical lens systems configured to compensate for chromatic aberration, and particularly to an apochromatic lens suitable for wideband applications.

2. Discussion of the Known Art

U.S. Pat. No. 5,333,076 (Jul. 26, 1994) discloses a stabilized imaging system intended for use in aerial reconnaissance systems, including a fixed lens assembly and a movable electro-optic imager element. The lens assembly has an external entrance pupil located between a rotating prism and a stationary prism, so that the apertures of the two prisms can be made relatively small for a given field of view. In addition, the prisms provide a level of compensation for chromatic aberration that occurs within the lens assembly.

Lens assemblies or systems such as disclosed in the '076 patent are constructed to compensate for chromatic dispersion inherent in each lens element of the system. The systems are typically apochromatic; that is, the lens elements are configured and positioned relative to one another so that the focal length of the lens system is the same at both ends of the light spectrum of interest (achromatic), and at one or more other intermediate wavelengths (apochromatic). Without such compensation, the focal length of the system would change undesirably with the light spectrum received from the object, yielding axial chromatic aberration which causes color fringes to appear at the edges of the projected image of the object. Another example of an apochromatic lens system is disclosed in U.S. Pat. No. 5,973,859 (Oct. 26, 1999). See also U.S. Pat. No. 6,147,815 (Nov. 14, 2000). So-called achromatic lens systems are constructed to obtain the same focal length only at two wavelengths over the spectrum of interest. See, e.g., U.S. Pat. No. 5,959,785 (Sep. 28, 1999).

Chromatic dispersion in a glass lens element occurs because the index of refraction (n) of the glass varies with the wavelength of light transmitted through the glass. The degree of this variation is represented by the so-called Abbe number (V) for a given type of glass. Specifically, $$V = (n_d - 1)/(n_f - n_C);$$

where $n_d$ is the index of refraction of the glass at the wavelength of the helium d line (587.6 nm), $n_f$ is the index at the hydrogen f line (486.1 nm), and $n_C$ is the index at the hydrogen c line (656.3 nm).

Accordingly, the smaller the value of V, the greater the chromatic dispersion through the glass. Typical Abbe numbers for various types of optical glass are given below:

| Glass type | Abbe number (V) |
| --- | --- |
| SF11 | 25.76 |
| LaSFN9 | 32.17 |
| F2 | 36.37 |
| BaK1 | 57.55 |
| BK7 | 64.17 |
| Fused silica | 67.8 |

By combining two lens elements with different Abbe numbers, a lens system can be made to have zero axial chromatic aberration (achromatic correction) for the f and the c lines. These lens systems typically arrange the two lens elements, one positive and one negative, to be in contact or cemented to one another in an arrangement called an achromatic doublet. For the achromatic doublet, the powers and the dispersions of the elements add and are chosen to yield zero total dispersion by satisfying the following equations:

$$\Phi_p/V_p = -\Phi_n/V_n \qquad \text{Eq. 1}$$

$$\Phi = \Phi_p + \Phi_n \qquad \text{Eq. 2}$$

where
 $\Phi$ = power of the lens system
 $\Phi_p$ = power of the positive lens
 $\Phi_n$ = power of the negative lens
 $\Phi V_p$ = Abbe number of the positive lens
 $\Phi V_n$ = Abbe number of the negative lens A lens system that is corrected for axial chromatic aberration will typically still exhibit some residual chromatic aberration known as secondary spectrum. Secondary spectrum is measured by the difference between the axial position of the system's corrected common f and c line focus point, and the position of the focus point for another wavelength within the spectrum, typically measured at the d line. In this case, the remaining secondary spectrum produces green or purple fringes to appear on images of objects having sharp edges.

The secondary spectrum for a cemented doublet having a focal length (f), is given by:

$$SS = [(-f)(P_p - P_n)]/(V_p - V_n) \qquad \text{Eq. 3}$$

where
 $P_p$ = partial dispersion of the positive lens
 $P_n$ = partial dispersion of the negative lens and the partial dispersion P for either lens is defined by $$P = (n_d - n_f)/(n_f - n_c) \qquad \text{Eq. 4}$$

For a cemented doublet to have a zero secondary spectrum, the two lens glasses must be chosen so as to have different Abbe numbers but the same partial dispersion. This is very difficult since most glasses exhibit a linear relationship between Abbe number and partial dispersion. By careful selection of glasses, most achromatic doublets can only reduce their secondary spectrum rather than completely eliminating it. To eliminate secondary spectrum completely, apochromatic lens systems typically utilize a minimum of three lens elements, and employ glasses having abnormal partial dispersion, i.e., a dispersion that varies non-linearly with the Abbe number of the glass as explained below. By carefully arranging the powers of the lens elements, their Abbe numbers and partial dispersions, all three lines (f, d, c) can be brought to a common focus point.

Wideband apochromatic lens systems employ the same approach of careful selection of lens element powers, Abbe numbers and partial dispersions. Wideband systems must therefore employ a greater number of lens elements and types of glass due to the extended spectrum, however, and partial dispersions for an extended set of wavelengths must also be considered.

Partial Dispersion and Abnormal Dispersion for General Set of Wavelengths

The relative partial dispersion $P_{x,y}$ for a given type of glass for a general set of wavelengths is defined by:

$$P_{x,y} = (n_x - n_y)/(n_f - n_c) \qquad \text{Eq. 5}$$

where the subscripts x and y denote standard spectral line assignments associated with specific refractive index values.

The dispersive characteristics of various types of glass may then be compared by plotting the relative partial dispersion $P_{x,y}$ versus the Abbe number V. These quantities share a linear correspondence for most optical glasses and therefore plot along a single straight line. Glasses that exhibit this linear behavior are referred to as normal dispersion glasses. The partial dispersion of these glasses can be approximately described by the following equation:

$$P_{x,y} a_{x,y} + b_{x,y} \cdot V \qquad \text{Eq. 6}$$

where $a_{x,y}$ and $b_{x,y}$ are constants. Glasses which deviate significantly from the line described by Equation 6 are called abnormal dispersion glasses. For such glass types, the deviation of partial dispersion from the normal line can be represented by the quantity $\Delta P_{x,y}$. A more precise expression for $P_{x,y}$ may then be given by the following equation:

$$P_{x,y} = a_{x,y} + b_{x,y} \cdot V + \Delta P_{x,y} \qquad \text{Eq. 7}$$

In their catalogs and publications, suppliers of glass materials typically provide $\Delta P_{x,y}$ values as referenced to a straight line defined by the $P_{x,y}$ values for a given type of glass. See, e.g., SCHOTT Technical Information Publication TIE-29, Refractive Index and Dispersion (April 2005); and R. E. Fischer, et al. (OPTICS 1, Inc. and SCHOTT AG), "Removing the Mystique of Glass Selection", at Internet URL <http:/www.optics1.com/pdfs/removing_mystique.pdf>. Both of these publications are incorporated by reference.

High quality wideband apochromatic lens systems typically employ eight or more lens elements formed from at least five or more different types of glass. This results in a complex lens assembly with higher cost, lower transmittance, and higher susceptibility to glass obsolescence. Consequently, if only one of the required glasses becomes obsolete and a suitable substitute glass cannot be found, a costly redesign often becomes necessary. Because of these disadvantages, a wideband apochromatic lens system that requires fewer lens elements and fewer glass types while offering color correction over a wide spectrum of, e.g., about 400 nm bandwidth, is highly desirable.

SUMMARY OF THE INVENTION

According to the invention, an apochromatic lens system for use with an external aperture stop, includes a first optical group having positive optical power, a second optical group having negative optical power and a third optical group having positive optical power, mounted axially in order from a front end to a rear end of a lens barrel. The first optical group includes four optical elements having, in order from the front end of the barrel, a negative optical power, a positive optical power, a negative optical power, and a positive optical power. The second optical group includes one optical element of a negative optical power; and the third group includes two optical elements each having a positive optical power. All of the mentioned optical elements are formed from not more than three different types of glass material.

According to another aspect of the invention, an apochromatic lens system for use with an internal aperture stop, includes a first optical group having positive optical power, a second optical group having positive optical power and a third optical group having negative optical power, mounted axially in order from a front end to a rear end of a lens barrel. The first optical group includes four optical elements having, in order from the front end of the barrel, a positive optical power, a negative optical power, a positive optical power, and a negative optical power. The second optical group includes one optical element of positive optical power, and the third optical group includes one optical element of negative optical power. All of the mentioned optical elements are formed from not more than three different glass materials.

For a better understanding of the invention, reference is made to the following description taken in conjunction with the accompanying drawing and the appended claims.

BRIEF DESCRIPTION OF THE DRAWING

In the drawing:

FIGS. 4 & 5 are tables listing properties of optical elements in the embodiment of FIG. 1;

FIG. 7 shows rim ray curves for the second embodiment of FIG. 6;

FIGS. 9 & 10 are tables listing properties of optical elements in the embodiment of FIG. 6;

FIGS. 14 & 15 are tables listing properties of optical elements in the embodiment of FIG. 11.

DETAILED DESCRIPTION OF THE INVENTION

Figure 1:
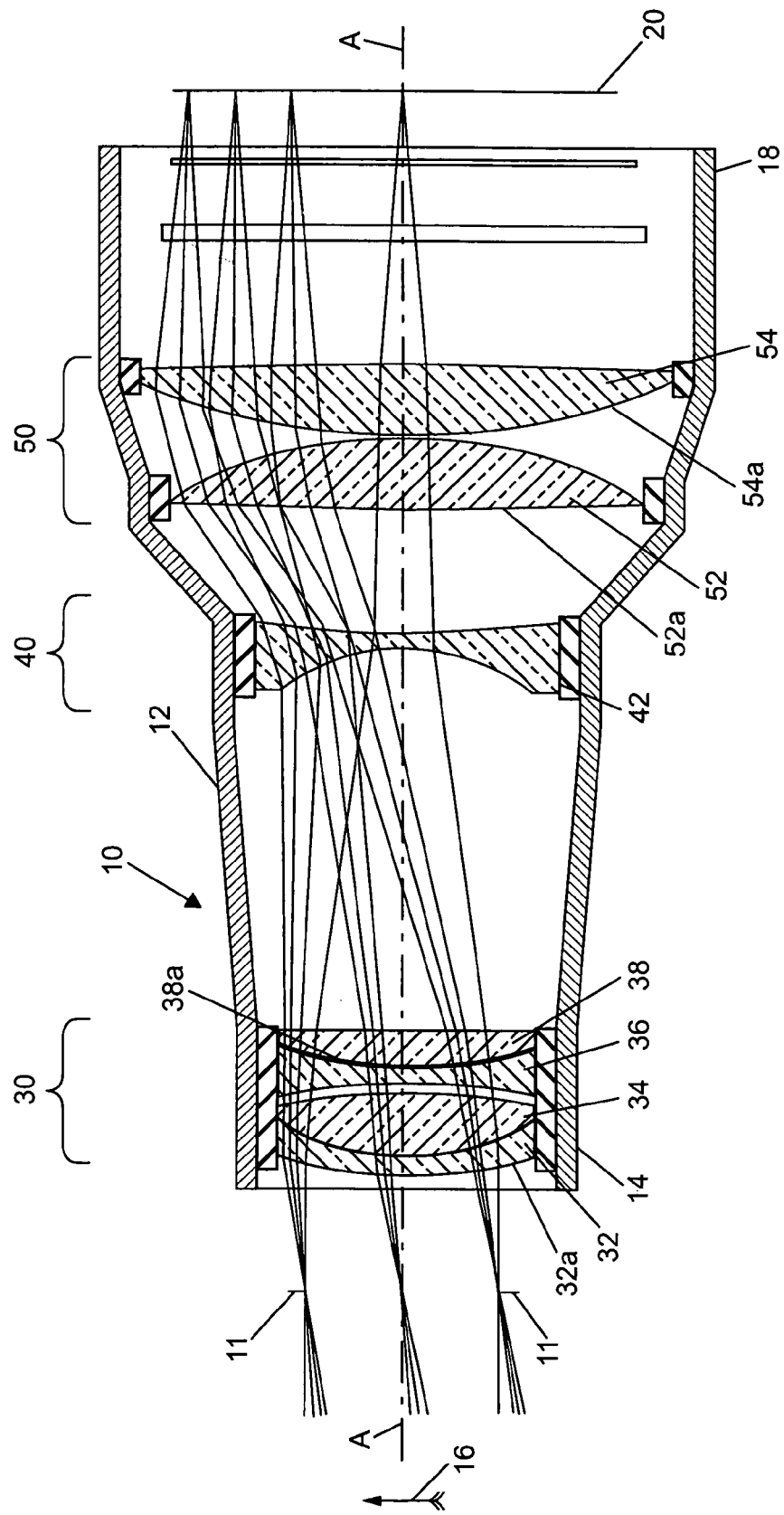
FIG. 1 shows a first embodiment of an apochromatic lens system according to the invention.

FIG. 1 shows a first embodiment of an apochromatic lens system 10 according to the invention. The system 10 is configured for use with an external aperture stop 11.

The lens system 10 basically includes a lens barrel 12 having an axis A-A. The barrel 12 is supported by a bracket or other structure not shown in FIG. 1, so as to face a distant object 16 a true and clear image of which is needed for purposes of imaging or projection. The image of the object 16 is formed onto an imaging surface 20 that is aligned with a back end 18 of the barrel. The surface 20 may incorporate, for example, a number of charge coupled devices (CCDs) mounted in a focal plane array (FPA) for converting the image into corresponding electrical (e.g., digital) signals. See the mentioned U.S. Pat. No. 5,333,076 all relevant portions of which are incorporated by reference. In other applications, the imaging surface 20 may constitute a direct viewing surface or screen.

A first optical group 30, a second optical group 40, and a third optical group 50 of optical elements or lenses are mounted inside the lens barrel 12 in the stated order from the front end 14 toward the rear end 18 of the barrel, in alignment with the barrel axis A-A. The first optical group 30 has an overall positive power, and is configured to converge light received from the object 16 and to direct the converged light onto the second optical group 40. The group 30 includes four optical elements 32, 34, 36, 38 having, in order starting from the barrel front end 14; a negative optical power, a positive optical power, a negative optical power, and a positive optical power. Elements 32, 34 and elements 36, 38 may, if desired, be cemented to one another as noted below.

As seen in FIG. 1, the first optical element 32 of the first optical group 30 is in the form of a negative meniscus lens whose convex surface 32a faces toward the object 16. The surface 32a may be formed aspherical in order to reduce the F number of the lens system 10.

The second optical element 34 of the group 30 is a double convex lens, the third optical element 36 is a double concave lens, and the fourth optical element 38 is a positive meniscus lens whose convex surface 38a faces toward the object 16.

Further, as mentioned, the first and the second optical elements 32, 34 of the first optical group 30 may be cemented to one another for additional chromatic aberration correction. The third and the fourth optical elements 36, 38 of the group 30 may also be cemented to one another for the same reason.

The mutual configuration of the four optical elements of the first optical group 30 allows for correction of pupil spherical aberration, spherical aberration and for coma correction, while satisfying relationships required among the optical elements needed to achieve a desired overall color correction by the lens system 10.

The second optical group 40 has a negative optical power, and is configured to diverge the converged light from the first optical group 30 and to direct the diverged light onto the third optical group 50. The second optical group 40 includes only one optical element 42 of a negative optical power, for example, a double convex lens as shown in FIG. 1. This shape allows for coma and field spherical aberration correction.

The third optical group 50 has an overall positive optical power, and is configured to converge the diverged light from the second optical group 40, and to focus the light onto the imaging surface 20 aligned with the back end 18 of the lens barrel 12. The third optical group 50 includes two optical elements 52, 54 each of positive optical power. In the embodiment of FIG. 1, the first element 52 of the third optical group 50 is a double convex lens, and the second element 54 is also a double convex lens. This configuration enables correction of astigmatism and field curvature. Further, a first surface 54a of the second element 54 facing toward the object 16 may be made aspherical in order to correct residual monochromatic aberrations cross field.

The apochromatic lens system 10 in FIG. 1 requires a total of only seven optical elements, and all the elements may be formed from only three different types of commercially available glass. For example:

| Glass Material | Source | Optical Elements |
|---|---|---|
| SBSM7I | OHARA | 34, 52 |
| KFZSN5 | SCHOTT | 32, 36, 42 |
| SLAM51 | OHARA | 38, 54 |

Further, the following relationships among the optical groups 30, 40, 50 and their constituent optical elements have been found to allow the lens system 10 to perform well over a wide spectral band as noted below.

$F'/F'_I > 0.7$;

$|F'_I/F'_{II}| > 1.5$;

$0.35 < |F'_{II}/F'_{III}| < 0.85$;

$0.45 < V_1/V_2 \approx V_5/V_6 \approx V_5/V_7 < 0.75$;

$0.85 < (V_1/V_2)/(V_3/V_4) < 1.15$;

$3.75 < |\Delta P_1/\Delta P_2| \approx \Delta P_5/\Delta P_6 < 4.75$;

$0.2 < (\Delta P_1/\Delta P_2)/(\Delta P_3/\Delta P_4) < 0.4$; and $0.85 < (\Delta P_3/\Delta P_4)/(\Delta P_5/\Delta P_7) < 1.15$;

wherein:

F' is the focal length of the lens system 10;

$F'_I$, $F'_{II}$ and $F'_{III}$ are focal lengths of the first, the second, and the third optical groups 30, 40, 50;

$V_1$, $V_2$, $V_3$ and $V_4$ are Abbe numbers for each of the optical elements 32, 34, 36, 38 of the first optical group 30 in the stated order;

$V_5$ is the Abbe number of the optical element 42 of the second optical group 40;

$V_6$ and $V_7$ are the Abbe numbers for the optical elements 52, 54 of the third optical group 50 in the stated order; and $\Delta P_1$, $\Delta P_2$, $\Delta P_3$, $\Delta P_4$, $\Delta P_5$, $\Delta P_6$ and $\Delta P_7$ are measured deviations of relative partial dispersion from linearity with respect to the Abbe number for the corresponding optical element.

Figures 2C, 2D:
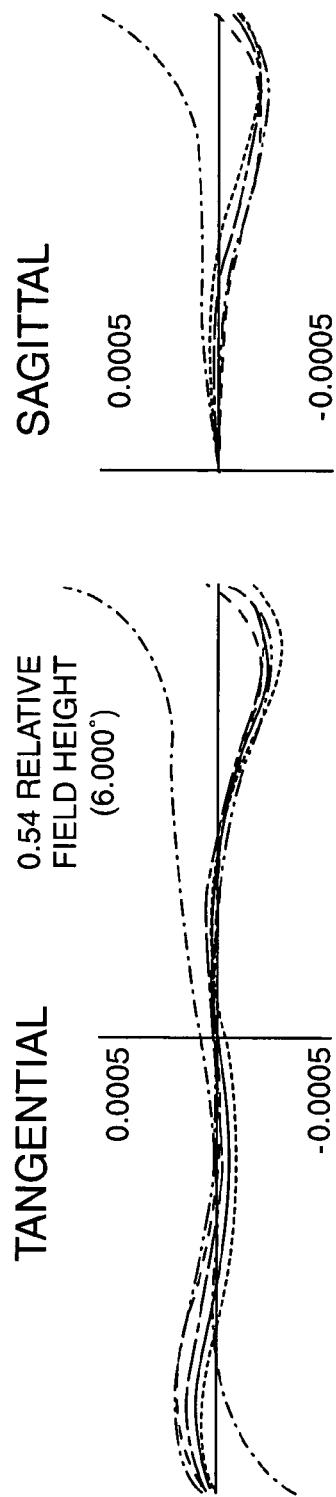
FIG. 2 shows rim ray curves for the first embodiment of FIG. 1.
Figure 3:
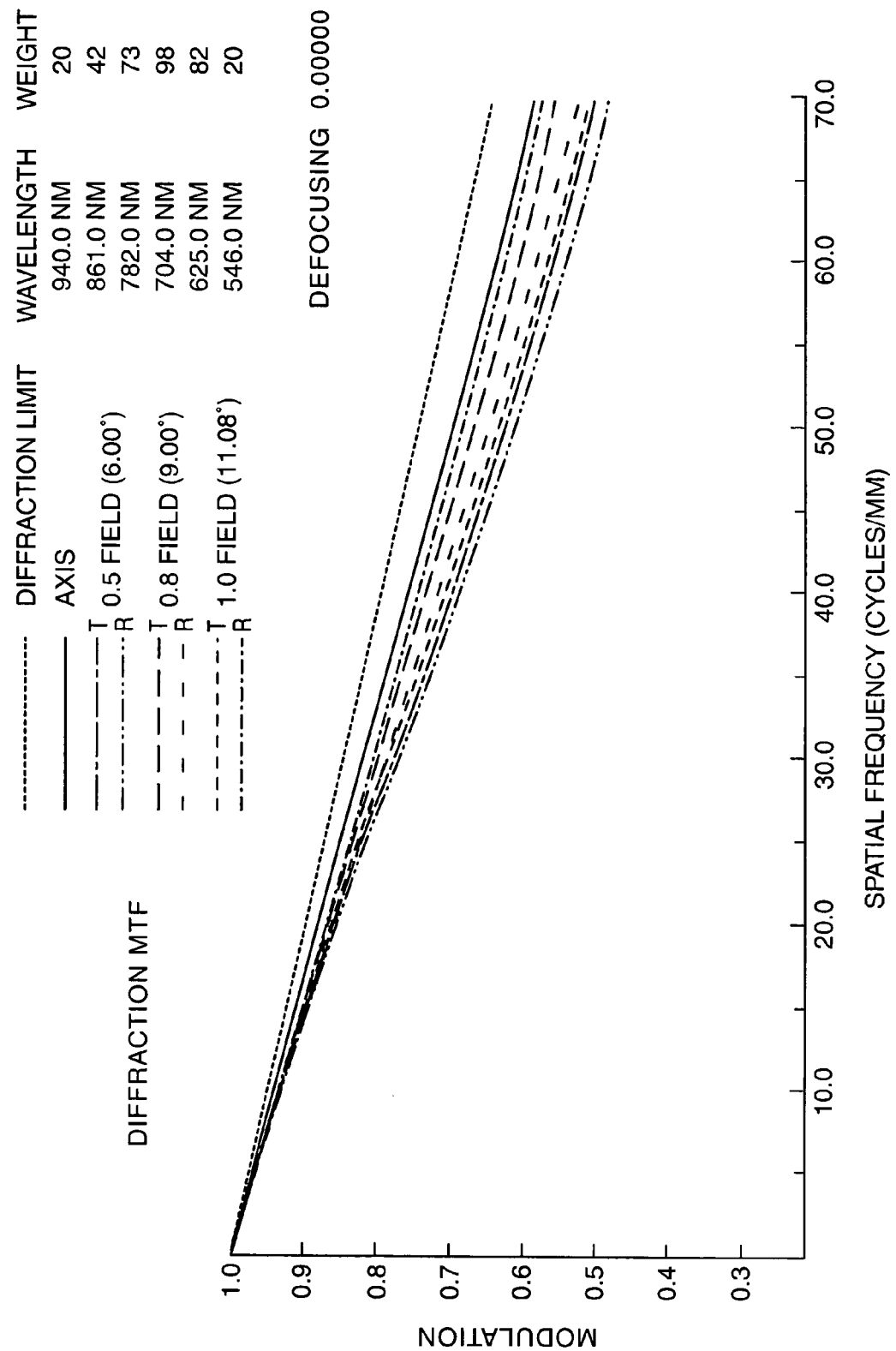
FIG. 3 is a graph showing a modulation transfer function (MTF) for the first embodiment of FIG. 1.

FIG. 2 shows rim ray curves obtained with the lens system 10 in FIG. 1, FIG. 3 shows a corresponding modulation transfer function (MTF) for the system, and FIGS. 4 & 5 are tables listing properties of the optical elements in the system 10.

The secondary spectrum is corrected, and near diffraction quality is obtained over the whole field of view across a wide wavelength band of 546 nm to 940 nm when the glass manufacturer's specified $\Delta P_{d,C}$ value was used for $\Delta P_n$ for each of the corresponding optical elements. Glass manufacturers may specify a number of different $\Delta P$ values for a given glass (e.g., $\Delta P_{d,C}$; $\Delta P_{c,f}$; $\Delta P_{C,s}$; etc.). The selection of the particular $\Delta P$ value should correspond with a central portion of the spectral band over which the inventive lens system 10 is desired to perform.

Figure 6:
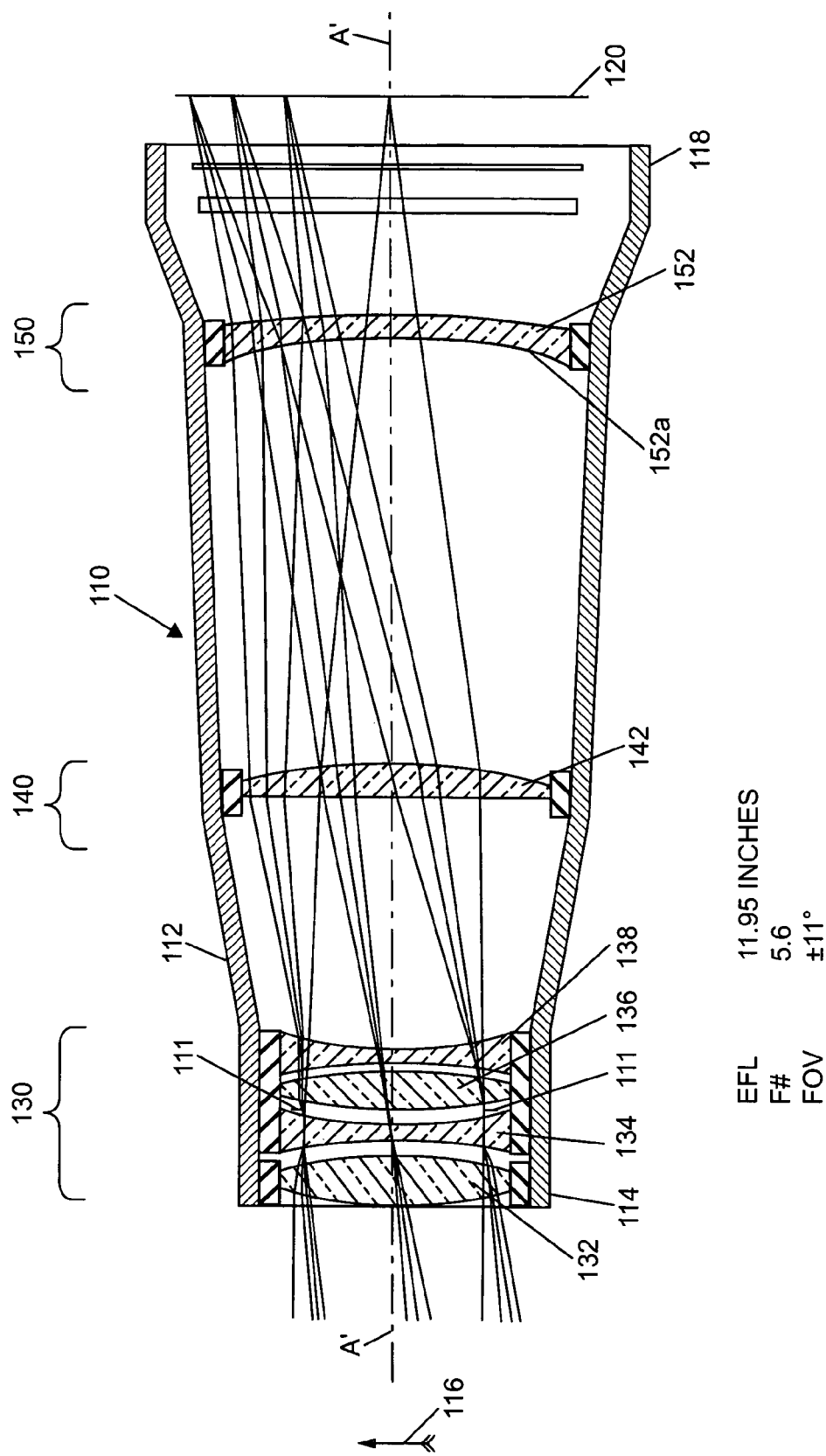
FIG. 6 shows a second embodiment of an apochromatic lens system according to the invention.

FIG. 6 shows a second embodiment of an apochromatic lens system 110 according to the invention. The system 110 is configured for use with an internal aperture stop 111.

The system 110 includes a lens barrel 112 having an axis A'-A'. The barrel 112 is supported by a bracket or other structure not shown in FIG. 4 so as to face a distant object 116 a true and sharp image of which is needed for purposes of imaging or projection. The image of the object 116 is projected onto an imaging surface 120 that is aligned with a back end 118 of the barrel. The surface 120 may, for example, incorporate a number of CCDs mounted in a focal plane array for converting the object image into corresponding electrical signals, or constitute a direct viewing surface or screen.

A first optical group 130, a second optical group 140, and a third optical group 150 of optical elements are mounted inside the lens barrel 112 in the stated order from the front end 114 toward the rear end 118 of the barrel, in alignment with the barrel axis A'-A'. The first optical group 130 has an overall positive power, and is configured to converge light received from the object 116 and direct the converged light onto the second optical group 140. The group 130 includes four optical elements 132, 134, 136, 138 having, in order starting from the barrel front end 114; a positive optical power, a negative optical power, a positive optical power, and a negative optical power.

As seen in FIG. 6, the first optical element 132 of the first optical group 130 is in the form of a biconvex lens, and the second optical element 134 of the group is in the form of a biconcave lens. Further, while not shown in the drawing, the first optical element 132 and the second optical element 134 may be cemented to one another depending on necessary color correction features.

The third optical element 136 of the first optical group 130 is in the form of a biconvex lens, and the fourth optical element 138 of the group is in the form of a biconcave lens. The third optical element 136 and the fourth optical element 138 may also be cemented to one another for the above reason.

The second optical group 140 has an overall positive optical power, and is configured further to converge the light from the first optical group 130, and to direct the converged light onto the third optical group 150. The second optical group 140 includes only one optical element 142 of a positive optical power, wherein the element 142 is in the form of a positive meniscus lens.

The third optical group 150 has an overall negative optical power, and is configured to focus the converged light from the second optical group 140 onto the imaging surface 120 aligned with the back end 118 of the lens barrel 112. The third optical group 150 includes only one optical element 152 possessing a negative optical power, wherein the element 152 is a negative meniscus lens whose concave surface 152a faces toward the object 116.

In the lens system 110 in FIG. 6, the first optical element 132 of the first optical group 130, the sole optical element 142 of the group 140, and the sole optical element 152 of the group 150, can be made aspherical to increase the F # of the lens system 110 if desired.

The apochromatic lens system 110 in FIG. 6 requires only six optical elements, and the elements may be formed from only three different types of commercially available glass. For example:

| Glass Material | Source | Optical Elements |
| --- | --- | --- |
| NLAF2 | SCHOTT | 136 |
| KZFSN5 | SCHOTT | 134, 138, 152 |
| SLAL54 | OHARA | 132, 142 |

Further, the following relationships among the optical groups 130, 140, 150 and their constituent optical elements have been found to allow the lens system 110 to perform well over a wide spectral band as noted below.

$|F'/F'_I| < 0.35;$ $|F'_I/F'_{II}| > 4;$ $0.45 < |F'_{II}/F'_{III}| < 0.75;$ $1.3 < V_1/V_2 \approx V_5/V_6 < 1.5;$ $1.15 < (V_1/V_2)/(V_3/V_4) < 1.45;$ $0.10 < |\Delta P_1/\Delta P_2 \approx \Delta P_5/\Delta P_6| < 0.25;$ and $1.1 < (\Delta P_1/\Delta P_2)/(\Delta P_3/\Delta P_4) < 1.35;$ wherein:

F' is the focal length of the lens system 110;

$F'_I$, $F'_{II}$ and $F'_{III}$ are focal lengths of the first, the second and the third optical groups 130, 140, 150;

$V_1$, $V_2$, $V_3$ and $V_4$ are Abbe numbers for each of the optical elements 132, 134, 136, 138 of the first optical group 130 in the stated order;

$V_5$ is the Abbe number of the optical element 142 of the second optical group 140;

$V_6$ is the Abbe number of the optical element 152 of the third optical group 150; and $\Delta P_1$, $\Delta P_2$, $\Delta P_3$, $\Delta P_4$, $\Delta P_5$, and $\Delta P_6$ are measured deviations of relative partial dispersion from linearity with respect to the Abbe number for the corresponding optical element.

Figure 8:
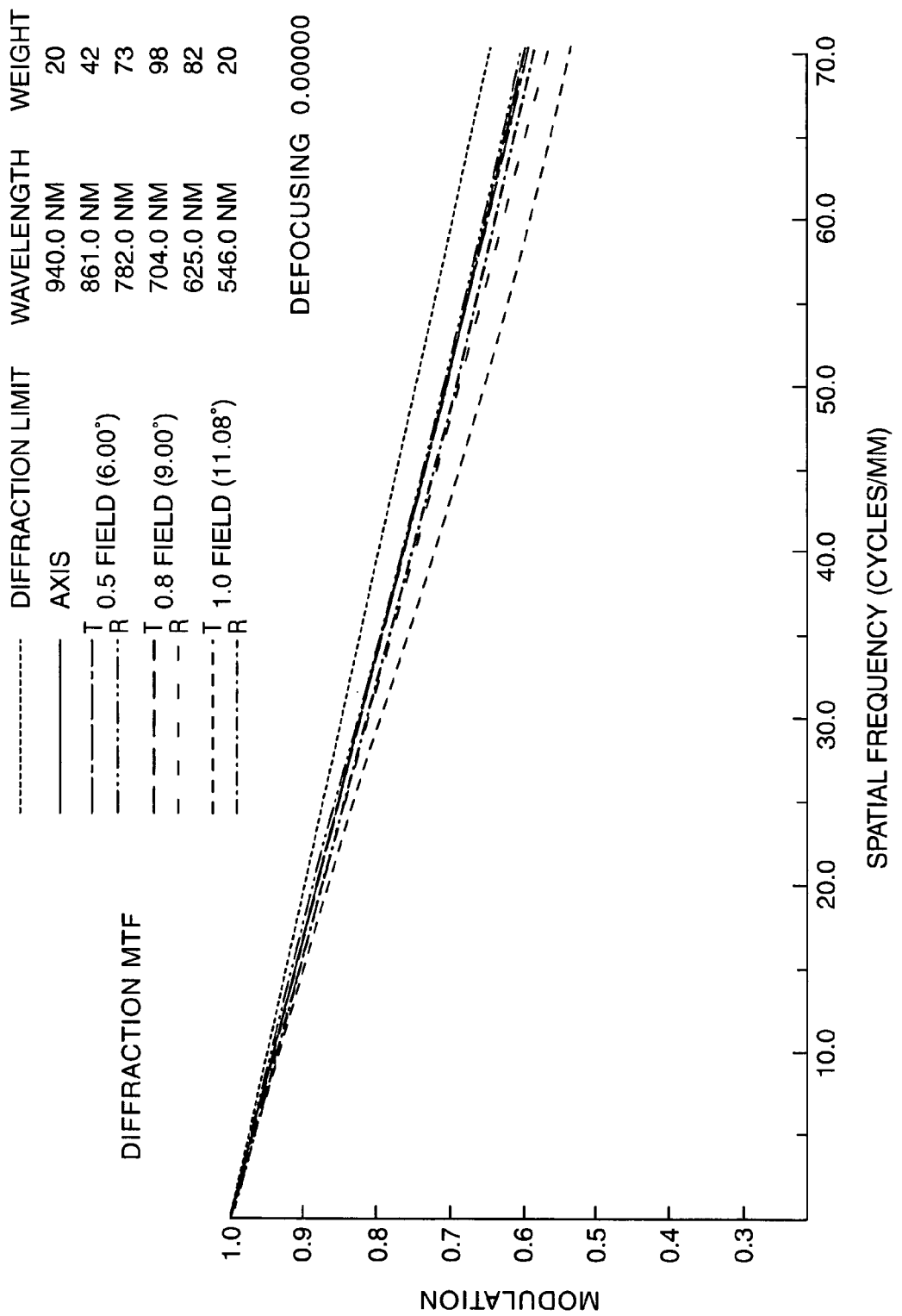
FIG. 8 is a graph showing a modulation transfer function for the second embodiment of FIG. 6.

FIG. 7 shows rim ray curves for the apochromatic lens system 110, FIG. 8 shows a modulation transfer function for the system, and FIGS. 9 & 10 are tables listing properties of the optical elements in the system 110. The system exhibits a diffraction limited correction across the field of view and over a wide spectrum of wavelengths from 546 nm to 940 nm, when the glass manufacturer's specified $\Delta P_{d,C}$ value was used for $\Delta P_n$ for each of the corresponding optical elements.

Figure 11:
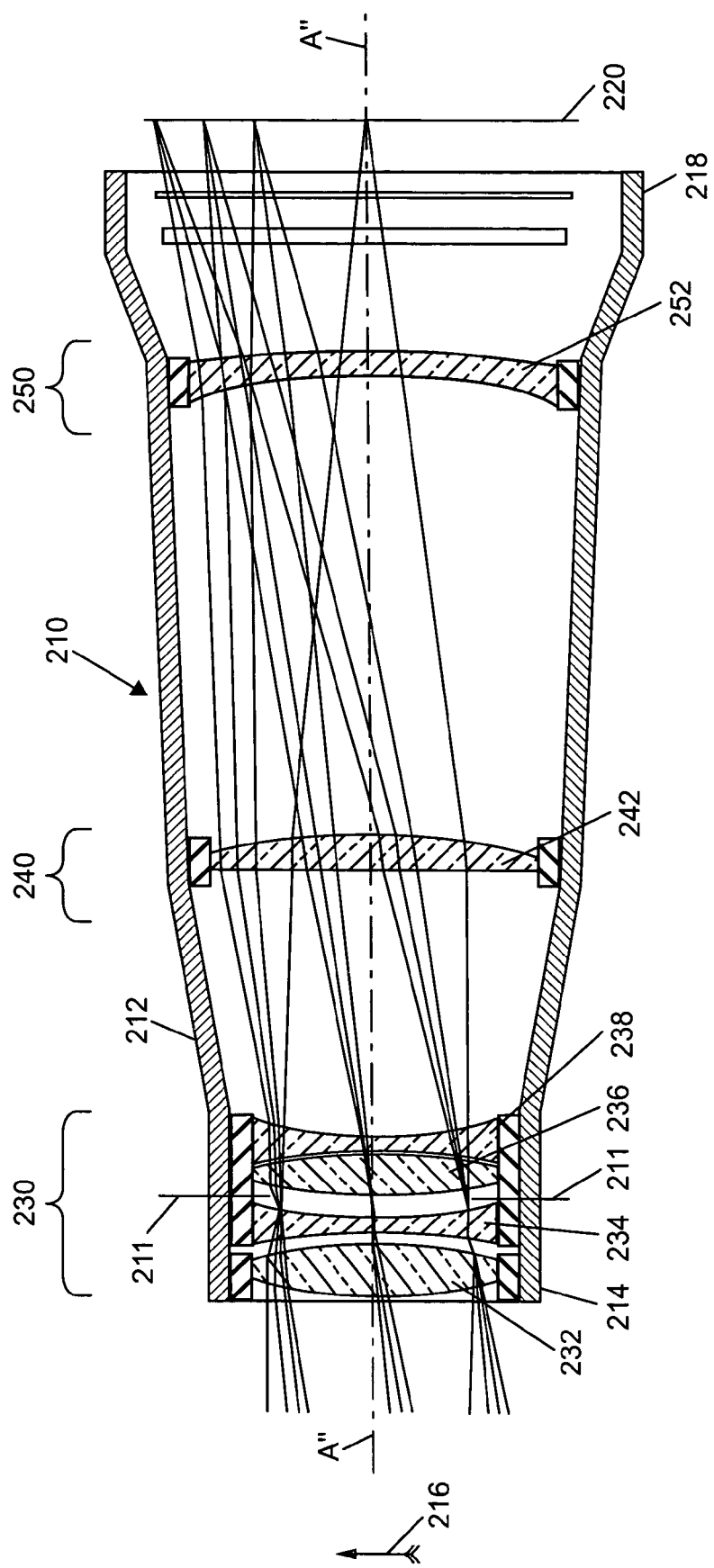
FIG. 11 shows a third embodiment of an apochromatic lens system according to the invention.

FIG. 11 shows a third embodiment of an apochromatic lens system 210 according to the invention. The system 210 is configured for use with an internal aperture stop 211. Parts of the system 210 that correspond to those of the system 110, have the same reference numerals increased by 100.

The lens system 210 also requires only six optical elements that may be formed from only three different types of glass. For example:

| Glass Material | Source | Optical Elements |
| --- | --- | --- |
| NLAF2 | SCOTT | 236 |
| SLAL54 | OHARA | 232, 242 |
| EADF50 | HOYA | 234, 238, 252 |

Figure 12A:
FIG. 12 shows rim ray curves for the third embodiment of FIG. 11.
Figure 12B:
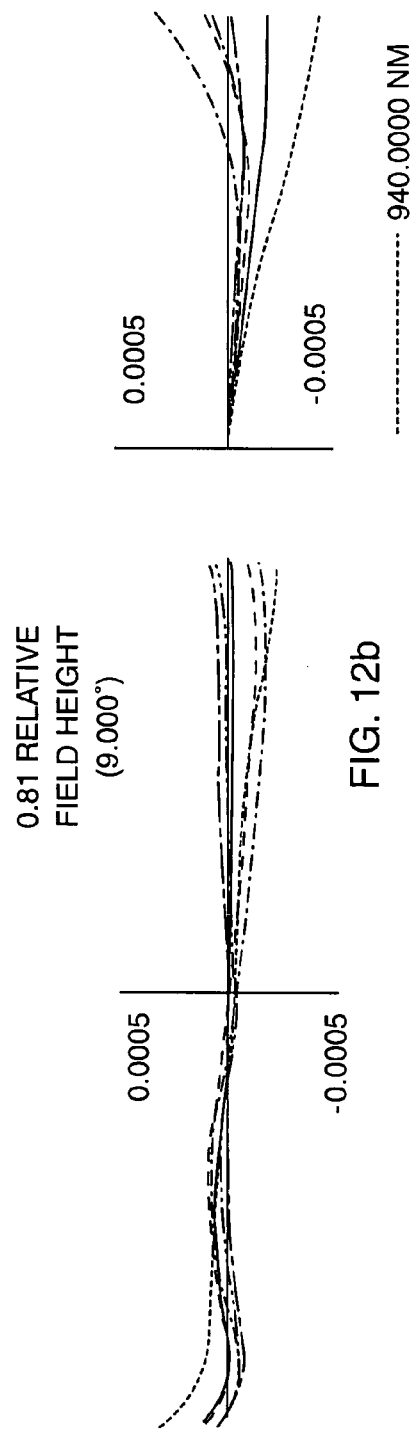
Figure 13:
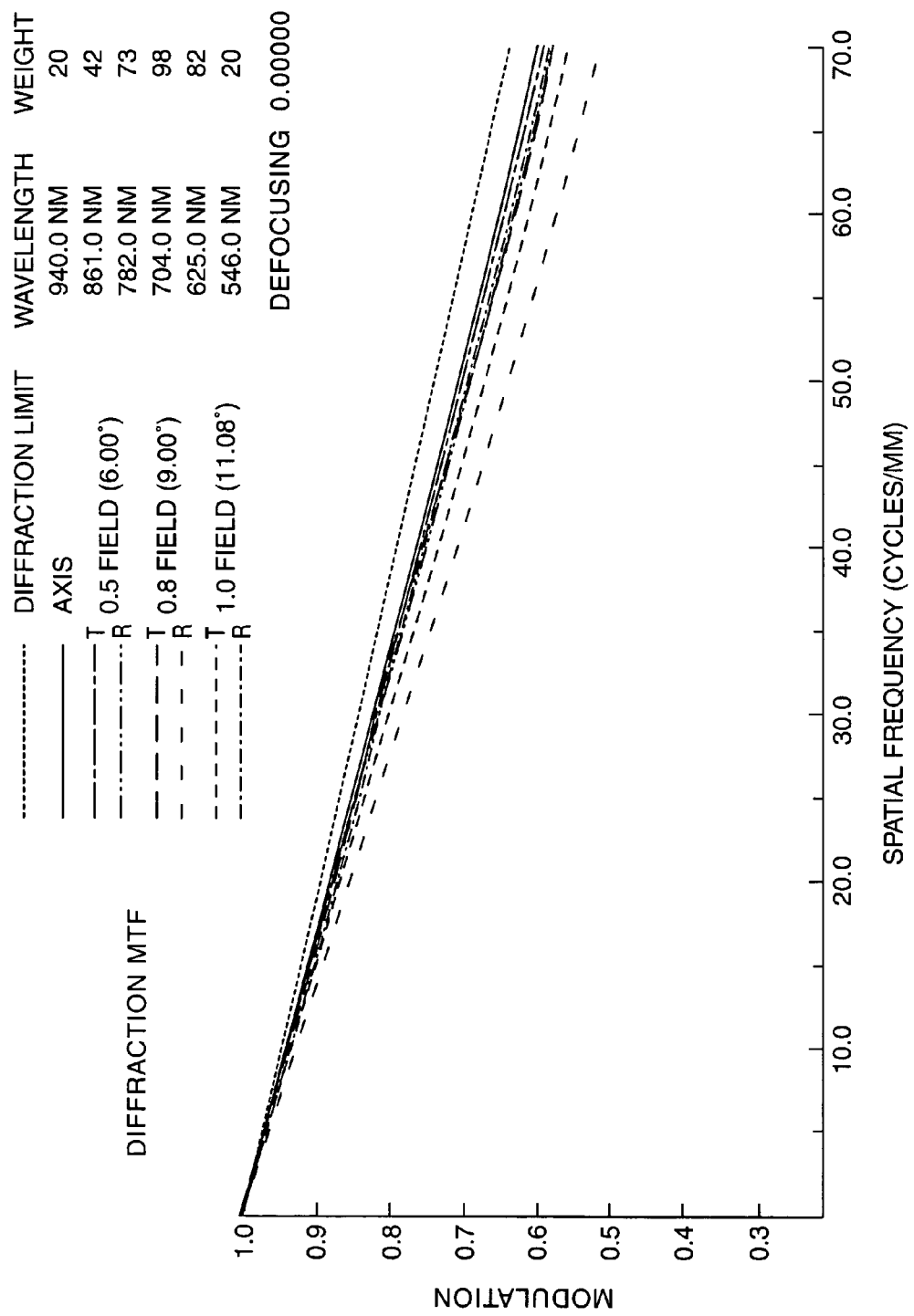
FIG. 13 is a graph showing a modulation transfer function for the third embodiment of FIG. 11.

Further, the following relationships among the optical groups 230, 240, 250 and their constituent optical elements have been found to allow the lens system 210 to perform well over a wide band as shown in FIGS. 12 and 13.

$F'_I/F'_{II} > 2.5;$ $1 < V_1/V_2 \approx V_5/V_6 < 1.2;$ $0.7 < (V_1/V_2)/(V_3/V_4) < 0.9;$ $0.25 < (\Delta P_1/\Delta P_2)(\Delta P_3/\Delta P_4) < 0.55$ where:

$F'_I$ and $F'_{II}$ are the focal lengths of optical groups 230 and 240, respectively;

$V_1$, $V_2$, $V_3$, $V_4$, $V_5$ and $V_6$ are the Abbe numbers for the optical elements 232, 234, 236, 238, 242 and 252; and $\Delta P_1$, $\Delta P_2$, $\Delta P_3$, and $\Delta P_4$ are deviations of relative partial dispersion from linearity with respect to the Abbe number for the optical elements 232, 234, 236 and 238.

FIG. 12 shows rim ray curves for the apochromatic lens system 210 of FIG. 11, and FIG. 13 is the corresponding modulation transfer function for system. FIGS. 14 & 15 are tables listing properties of optical elements in the system 210. Performance of the system is diffraction limited across the field and over a wide spectrum. The glass manufacturer's specified $\Delta P_{d,C}$ value was used for $\Delta P_n$ for each of the corresponding optical elements.

While the foregoing represents preferred embodiments of the invention, it will be understood by those skilled in the art that various changes and modifications may be made without departing from the spirit and scope of the invention, and that the invention includes all such modifications and changes as come within the scope of the following claims.

We claim:

1. An apochromatic lens system for use with an external aperture stop, comprising:
   a lens barrel having an axis, a front end for facing an outside object, and a back end for focusing an image of the object onto an imaging surface aligned with the back end of the barrel;
   a first optical group having positive optical power;
   a second optical group having negative optical power;
   a third optical group having positive optical power;
   the first, the second, and the third optical groups are mounted in the lens barrel axially in the stated order from the front end to the back end of the barrel;
   the first optical group comprises four optical elements having, in order from the front end of the lens barrel, a negative optical power, a positive optical power, a negative optical power, and a positive optical power, and the first optical group is arranged to converge light received from an object at the front end of the barrel and to direct the converged light onto the second optical group;
   the second optical group comprises one optical element having a negative optical power and is arranged to diverge the light from the first optical group and to direct the diverged light onto the third optical group; and
   the third optical group comprises two optical elements each having a positive optical power, and the third optical group is arranged to converge the light from the second optical group and to focus the converged light onto the imaging surface; wherein, $F'/F'_I > 0.7$;

$|F'_I/F'_{II}| > 1.5$;

$0.35 < |F'_{II}/F'_{III}| < 0.85$;

$0.45 < V_1/V_2 \approx V_5/V_6 \approx V_5/V_7 < 0.75$;

$0.85 < (V_1/V_2)/(V_3/V_4) < 1.15$;

$3.75 < \Delta P_1/\Delta P_2 1 \approx \Delta P_5/\Delta P_6 < 4.75$;

$0.2 < (\Delta P_1/\Delta P_2)/(\Delta P_3/\Delta P_4) < 0.4$;

$0.85 < (\Delta P_3/\Delta P_4)/(\Delta P_5/\Delta P_7) < 1.15$; and

F' is focal length of the lens system;
   $F'_I$, $F'_{II}$, and $F'_{III}$ are focal lengths of the first, the second and the third optical groups;
   $V_1$, $V_2$, $V_3$ and $V_4$ are Abbe numbers for each of the optical elements of the first optical group in order from the front end of the lens barrel;
   $V_5$ is the Abbe number of the optical element of the second optical group;
   $V_6$ and $V_7$ are Abbe numbers for the optical elements of the third optical group in the stated order from the front end; and
   $\Delta P_1$, $\Delta P_2$, $\Delta P_3$, $\Delta P_4$, $\Delta P_5$, $\Delta P_6$ and $\Delta P_7$ are deviations of relative partial dispersion from linearity with respect to the Abbe number for the corresponding optical element; and
   the optical elements of the first, the second, and the third optical group are formed from at most three different glass materials.

2. An apochromatic lens system according to claim 1, wherein the bandwidth of the system is approximately 550 nm to 940 nm.

3. An apochromatic lens system according to claim 1, including a focal plane array constructed and arranged to form the imaging surface.

4. An apochromatic lens system according to claim 1, wherein the first optical group comprises at most four optical elements, the second optical group comprises at most one optical element, and the third optical group comprises at most two optical elements.

5. An apochromatic lens system according to claim 1, wherein the first optical element of the first optical group is a negative meniscus lens, the second optical element of said group is a double convex lens, the third optical element of said group is a double concave lens, and the fourth optical element of said group is a positive meniscus lens.

6. An apochromatic lens system according to claim 1, wherein the optical element of the second optical group is a double convex lens.

7. An apochromatic lens system according to claim 1, wherein the first optical element of the third optical group is a double convex lens, and the second optical element of the third optical group is a double convex lens.

8. An apochromatic lens system according to claim 1, wherein the first optical element of the first optical group and the second optical element of said group are cemented to one another.

9. An apochromatic lens system according to claim 1, wherein the third optical element of the first optical group and the fourth optical element of said group are cemented to one another.

10. An apochromatic lens system according to claim 1, wherein the surface of the first optical element of the first optical group facing the object, is aspherical.

11. An apochromatic lens system according to claim 1, wherein the surface of the second optical element of the third optical group facing the object, is aspherical.

12. An apochromatic lens system for use with an internal aperture stop, comprising:
    a lens barrel having an axis, a front end for facing an outside object, and a back end for focusing an image of the object onto an imaging surface aligned with the back end of the barrel;
    a first optical group having positive optical power;
    a second optical group having positive optical power;
    a third optical group having negative optical power;
    the first, the second, and the third optical groups are mounted in the lens barrel axially in the stated order from the front end to the rear end of the barrel;
    the first optical group comprises four optical elements having, in order from the front end of the lens barrel, a positive optical power, a negative optical power, a positive optical power, and a negative power, and the first optical group is arranged to converge light received from an object at the front end of the barrel and to direct the converged light onto the second optical group;
    the second optical group comprises one optical element having a positive optical power, and is arranged further to converge the light from the first optical group, and to direct the converged light onto the third optical group; and
    the third optical group comprises one optical element having a negative power, and is arranged to focus the light from the second optical group onto the imaging surface; wherein, $F'/F'_I<0.35;$ $|F'_I/F'_{II}|>4;$ $0.45<|F'_{II}/F'_{III}|<0.75;$ $0.45<|F'_{II}/F'_{III}|<0.75;$ $1.3<V_1/V_2\approx V_5/V_6<1.5;$ $1.15<(V_1/V_2)/(V_3/V_4)<1.45;$ $0.10<|\Delta P_1/\Delta P_2|\approx|\Delta P_5/\Delta P_6|<0.25;$ $1.1<(\Delta P_1/\Delta P_2)/(\Delta P_3/\Delta P_4)<1.35;$ and F' is focal length of the lens system;

$F'_I$, $F'_{II}$ and $F'_{III}$ are focal lengths of the first, the second and the third optical groups;

$V_1$, $V_2$, $V_3$ and $V_4$ are Abbe numbers for each of the optical elements of the first optical group in order from the object side of the lens system;

$V_5$ is the Abbe number of the optical element of the second optical group;

$V_6$ is the Abbe number of the optical element of the third optical group; and $\Delta P_1$, $\Delta P_2$, $\Delta P_3$, $\Delta P_4$, $\Delta P_5$, and $\Delta P_6$ are deviations of relative partial dispersion from linearity with respect to the Abbe number for the corresponding optical element; and the optical elements of the first, the second, and the third optical group are formed from at most three different glass materials.

13. An apochromatic lens system according to claim 12, wherein the bandwidth of the system is approximately 550 nm to 940 nm.

14. An apochromatic lens system according to claim 12, including a focal plane array constructed and arranged to form the imaging surface.

15. An apochromatic lens system according to claim 12, wherein the first optical group comprises at most four optical elements, the second optical group comprises at most one optical element, and the third optical group comprises at most one optical element.

16. An apochromatic lens system according to claim 12, wherein the first optical element of the first optical group is a biconvex lens, the second optical element of said group is a biconcave lens, the third optical element of said group is a biconvex lens, and the fourth optical element of said group is a biconcave lens.

17. An apochromatic lens system according to claim 12, wherein the first optical element and the second optical element of the first group are cemented to one another.

18. An apochromatic lens system according to claim 12, wherein the third optical element and the fourth optical element of the first optical group are cemented to one another.

19. An apochromatic lens system according to claim 12, wherein the optical element of the second optical group is a positive meniscus lens.

20. An apochromatic lens system according to claim 12, wherein the optical element of the third optical group is a negative meniscus lens.

21. An apochromatic lens system for use with an internal aperture stop, comprising:

a lens barrel having an axis, a front end for facing an outside object, and a back end for focusing an image of the object onto an imaging surface aligned with the back end of the barrel;

a first optical group having positive optical power;

a second optical group having positive optical power;

a third optical group having negative optical power;

the first, the second, and the third optical groups are mounted in the lens barrel axially in the stated order from the front end to the rear end of the barrel;

the first optical group comprises four optical elements having, in order from the front end of the lens barrel, a positive optical power, a negative optical power, a positive optical power, and a negative power, and the first optical group is arranged to converge light received from an object at the front end of the barrel and to direct the converged light onto the second optical group;

the second optical group comprises one optical element having a positive optical power, and is arranged further to converge the light from the first optical group, and to direct the converged light onto the third optical group; and the third optical group comprises one optical element having a negative power, and is arranged to focus the light from the second optical group onto the imaging surface; wherein, $F'_I/F'_{II}>2.5;$ $1<V_1/V_2\approx V_5/V_6<1.2;$ $0.7<(V_1/V_2)/(V_3/V_4)<0.9;$ $0.25<(\Delta P_1/\Delta P_2)/(\Delta P_3/\Delta P_4)<0.55$ where:

$F'_I$ and $F'_{II}$ are the focal lengths of the first and the second optical groups, respectively;

$V_1$, $V_2$, $V_3$, and $V_4$ are Abbe numbers for each of the optical elements of the first optical group in order from the object side of the lens system;

$V_5$ is the Abbe number of the optical element of the second optical group;

$V_6$ is the Abbe number of the optical element of the third optical group;

$\Delta P_1$, $\Delta P_2$, $\Delta P_3$, and $\Delta P_4$ are deviations of relative partial dispersion from linearity with respect to the Abbe number for the corresponding optical element; and the optical elements of the first, the second, and the third optical group are formed from at most three different glass materials.

22. An apochromatic lens system according to claim 21, wherein the bandwidth of the system is approximately 550 nm to 940 nm.

23. An apochromatic lens system according to claim 21, including a focal plane array constructed and arranged to form the imaging surface.

24. An apochromatic lens system according to claim 21, wherein the first optical group comprises at most four optical elements, the second optical group comprises at most one optical element, and the third optical group comprises at most one optical element.

25. An apochromatic lens system according to claim 21, wherein the first optical element of the first optical group is a biconvex lens, the second optical element of said group is a biconcave lens, the third optical element of said group is a biconvex lens, and the fourth optical element of said group is a biconcave lens.

26. An apochromatic lens system according to claim 21, wherein the first optical element and the second optical element of the first group are cemented to one another.

27. An apochromatic lens system according to claim 21, wherein the third optical element and the fourth optical element of the first optical group are cemented to one another.

28. An apochromatic lens system according to claim 21, wherein the optical element of the second optical group is a positive meniscus lens.

29. An apochromatic lens system according to claim 21, wherein the optical element of the third optical group is a negative meniscus lens.

* * * * *